United States Patent [19]

Rouws

[11] Patent Number: 4,692,916
[45] Date of Patent: Sep. 8, 1987

[54] DISC-RECORD PLAYER COMPRISING A DISC-LOADING MECHANISM AND DISC-HOLDER FOR USE IN SUCH A PLAYER

[75] Inventor: Petrus L. A. Rouws, Eindhoven, Netherlands

[73] Assignee: U.S. Philips Corporation, New York, N.Y.

[21] Appl. No.: 808,664

[22] Filed: Dec. 13, 1985

Related U.S. Application Data

[63] Continuation of Ser. No. 617,066, Jun. 4, 1984, abandoned, which is a continuation-in-part of Ser. No. 571,225, Jan. 16, 1984, abandoned.

[30] Foreign Application Priority Data

Jun. 15, 1983 [NL] Netherlands ..................... 8302130

[51] Int. Cl.$^4$ ..................... G11B 17/04; G11B 23/02
[52] U.S. Cl. ..................... 369/75.2; 369/258; 369/270
[58] Field of Search ............ 369/75.2, 77.1, 77.2, 369/270, 271

[56] References Cited

U.S. PATENT DOCUMENTS

| | | | |
|---|---|---|---|
| 2,923,505 | 2/1960 | Immendorf | 248/20 |
| 4,272,794 | 6/1981 | Skarky | 369/75.2 |
| 4,337,533 | 6/1982 | Ando et al. | 369/75.2 |
| 4,347,596 | 8/1982 | Abe et al. | 369/75.2 |
| 4,433,410 | 2/1984 | Siryj et al. | 369/77.2 |
| 4,439,850 | 3/1984 | Takahara et al. | 369/77.2 |
| 4,482,991 | 11/1984 | Kawamura et al. | 369/77.2 |

FOREIGN PATENT DOCUMENTS

56-58167 5/1981 Japan .................... 369/75.2

Primary Examiner—Steven L. Stephan
Attorney, Agent, or Firm—F. Brice Faller

[57] ABSTRACT

Loading a disc onto the turntable there are provided transfer means comprising a frame and a disc holder which can be slid into and out of said frame and which can be lowered therewith axially past the turntable into a lower position in which the disc is supported on the turntable and is clear of the disc holder. The disc holder comprises a plurality of spring-loaded catches which are arranged circumferentially around the disc and which are movable in the radial direction. There is provided a plurality of stationary upwardly directed release elements with conical end portions, which, relative to guide means for the transfer means and a disc-pressure member, occupy positions such that the catches are released when the transfer means are lowered past the turntable, whereupon the discpressure member urges the disc against the turntable. Near each catch the disc holder has a surface for supporting the disc and the disc holder is open at the upper side.

15 Claims, 7 Drawing Figures

DISC-RECORD PLAYER COMPRISING A DISC-LOADING MECHANISM AND DISC-HOLDER FOR USE IN SUCH A PLAYER

This is a continuation of application Ser. No. 617,066, filed June 4, 1984, now abandoned; which was a continuation-in-part of Ser. No. 571,225, filed Jan. 16, 1984, abandoned.

BACKGROUND OF THE INVENTION

The invention relates to a disc-record player comprising a housing in which a chassis is resiliently supported which carries a turntable and a loading mechanism for loading a record onto the turntable. The mechanism comprises transfer means which are movable in a substantially axial direction relative to the turntable between an upper position and a lower position for depositing a disc on the turntable, and a pressure member which is movable relative to the turntable for pressing the disc against the turntable. Control means are provided for controlling the upward and downward movements of the transfer means and the pressure member.

Known disc-record players of the above type are intended for playing optically readable discs, such as those of the "Compact-Disc" type. These discs require accurate centering relative to the turntable axis during the disc-loading operation. If during loading the housing of such a player is subjected to shocks or vibrations, the pre-centered position of the disc on the transfer means may be disturbed. Consequently, as it is transferred to the turntable the disc may be shifted off-center to such an extent that ultimately the disc occupies an incorrect position on the turntable and the disc is not played correctly.

SUMMARY OF THE INVENTION

It is the object of the invention to provide a disc-record player of the specified type with a loading mechanism which is immune to shocks and vibrations during loading.

To this end the invention is characterized in that the transfer means comprise a frame and a disc holder which can be slid into and out of said frame and which has an opening through which the turntable can pass to enable the transfer means to be lowered axially relative to the turntable into the lower position, in which position the disc deposited on the turntable is clear of the disc holder, the disc holder comprises a plurality of spring-loaded catches which are arranged so that they will be spaced around the circumference of the disc in the holder and will be movable radially of the disc, a plurality of upwardly directed release elements having conical end portions are arranged in the housing, the elements being fixed relative to the chassis of the turntable in positions with respect to the control means for the transfer means and the pressure member such that the catches are released as the transfer means are lowered past the turntable, whereupon the pressure member urges the disc against the turntable.

In this way a disc-record player is obtained in which the catches keep the disc correctly pre-centered on the holder until the last stage of loading, the pressure member urging the disc against the turntable when it has been released from the disc holder. A further advantage of latching the disc in the removable holder is that the user need not touch the disc but only has to grip the holder, the position of the holder being immaterial because the catches ensure that the disc cannot drop out of the holder. Thus, the information-carrying surface of the relevant disc is not touched, which is very important in optical discs, in particular those of the "Compact Disc" type, where such contact must be avoided in view of the adverse effect which fingerprints may have on the information-carrying surface. Moreover, the user can readily store the holder in a storage case intended for receiving a plurality of such holders. Another advantage of the player in accordance with the invention is that the downward movement of the holder towards and past the turntable enables the catches to be released by means of stationary release elements without the addition of a separate mechanism. This enables the loading mechanism to be constructed comparatively simply despite the presence of the catches and release elements. The high degree of shock and vibration resistance and the easy and reliable exchangeability of the discs render the disc-record player in accordance with the invention particularly suitable for use in vehicles.

A preferred embodiment of a disc-record player in accordance with the invention is characterized in that the frame comprises U-section guides for the disc holder on both sides, viewed in the direction of insertion of the disc holder, and has a slide-in portion which is movable to a position near a front aperture in the housing, in which position it stops on the upper side, so that the chassis is in a fixed position in the housing. The U-section guides facilitate sliding-in and sliding-out of the disc holder, which becomes even easier because the front portion of the frame can project through the front aperture. The U-section guides further ensure that forces which may occur when the catches on the disc holder are released can be taken up effectively via the frame. The stops ensure that in the loading position the frame occupies a stable position in the housing.

Another preferred embodiment of the invention is characterized in that the release elements comprise pins which in cooperation with the walls of apertures in the disc holder also center the disc holder relative to the turntable.

Thus, as it is lowered towards the turntable, the disc holder is effectively pre-centered by the release pins just before the disc is deposited on the turntable, so that after release the disc occupies a correctly centered position.

A disc holder for use in the disc-record player in accordance with the invention is characterized in that adjacent each catch the disc holder comprises a surface for supporting the disc, against which surface the disc bears in the latched position, and near its upper side the disc holder comprises a conical centering wall which bounds an area which is completely open towards the upper side. Thus, the disc holder has a maximum opening for the passage of the turntable and an optical read head of the player, the disc contacting the supporting surfaces of the disc holder only with portions which are outside the vulnerable information-carrying surface. When the disc is inserted into the disc holder the conical centering wall ensures that the disc readily assumes the correct position on the supporting surfaces.

In this respect a further embodiment of a disc holder in accordance with the invention is characterized in that the disc holder comprises a cylindrical wall which adjoins the centering wall and which has a diameter which is larger than the disc diameter, the catches being movable through the holes in the cylindrical wall and the supporting surfaces. Thus, when released the disc can readily leave the disc holder, without this movement being impeded by the catches.

Still another embodiment of a disc holder in accordance with the invention is characterized in that the disc holder comprises a bottom wall at the side which faces the turntable, which wall adjoins the cylindrical wall and extends across the bottom of a front part of the opening bounded by the cylindrical wall. When "Compact Disc" records are used which carry information only on the side facing the turntable, the bottom wall provides an effective protection against fingerprints for the information-carrying surface of the disc, which surface is located near the grip of the holder.

DETAILED DESCRIPTION OF THE INVENTION

Figure 1:
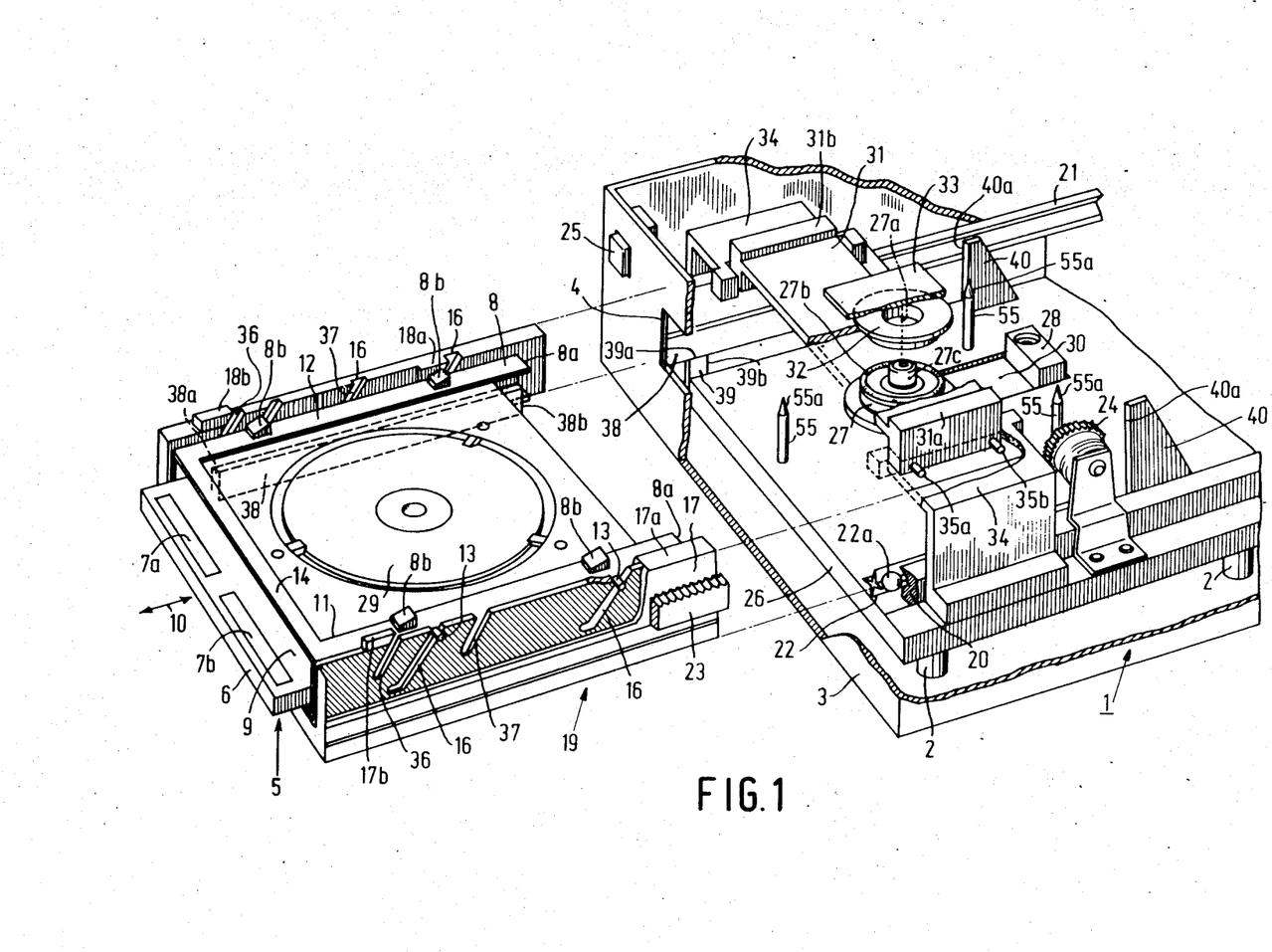
FIG. 1 is an exploded perspective view, partly cutaway, of a disc-record player in accordance with the invention, a carriage which carries the transfer means being shown removed from the housing for the sake of clarity.
Figure 2:
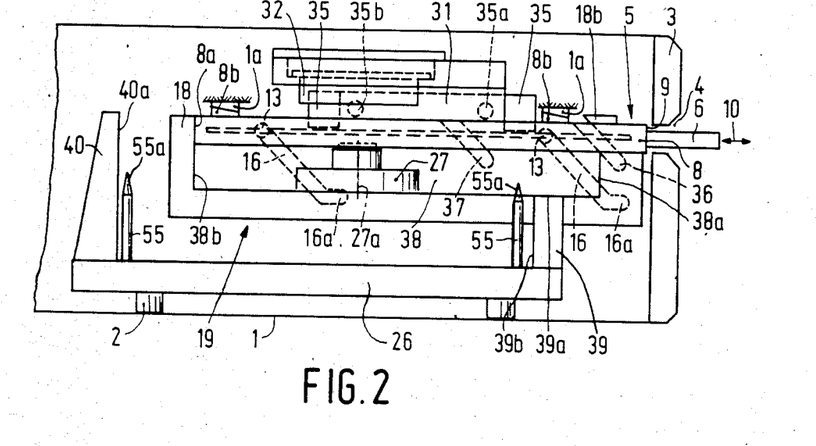
FIG. 2 is a schematic side view of the disc-record player shown in FIG. 1, the carriage being shown in a forward position in the housing.

The disc-record player shown in FIG. 1 comprises a housing 1 in which a chassis 26 is supported on rubber pads 2 for damping vibrations and/or shocks to which the housing is subjected. The housing 1 comprises a front wall 3 in which a front opening 4 is formed. As is also shown in FIG. 2, a disc holder 6 forming part of transfer means 5 can be inserted through the front opening 4. Adjacent grip portions 7a and 7b of the disc holder 6 project from the housing 1 in the position shown in FIG. 2. In this position the front of a frame 8, which also forms part of the transfer means 5, is situated near the back of the front wall 3, so that the disc holder 6 can readily be slid in the direction indicated by the arrow 10 through a loading slot 9 at the front of the frame 8.

Viewed in the sliding direction, the frame 8 comprises two parallel side members 11 and 12 of U-shaped cross-section which extend in the direction of the arrow 10 and which each carry a pair of pins 13. At their front ends the side members 11 and 12 are interconnected by a transverse member 14, preferably at both the lower side and the upper side. The distance between the upper and lower walls of the frame members 11 and 12 and the arrangement of these members relative to each other is such that they serve as guides for the insertion of the disc holder 6 into the frame 8 and also support the holder in the frame 8. The pins 13 on the frame members 11 and 12 engage slidably in inclined grooves 16 in the inner sides of two parallel side walls 17 and 18 of a carriage 19 which is movable in the direction of the arrow 10 between forward and rearward positions in the housing 1. The side walls 17 and 18 extend in the direction of movement of the carriage and are rigidly interconnected at their front ends.

In the housing 1 fixed rails 20 and 21 are arranged on the chassis 26, one at each side of the carriage 19. The rails extend in the direction of the arrow 10 and guide the carriage 19. For a smooth movement of the carriage, balls 22a mounted in elongate carriers 22 are arranged between the side walls 17, 18 and the rails 20, 21 respectively. On the outer side of the side wall 17 is a toothed rack 23 which extends in the direction of the arrow 10 and which cooperates with a toothed pinion 24 in the movement of the carriage 19. The pinion 24 may be connected to a motor (not shown) for automatically moving the carriage between its forward and rearward positions. In the case of electrical drive of the carriage by a motor, the disc holder 6 actuates a switch (not shown) when the end of the insertion movement of the disc holder into the frame 8 is reached. The switch starts the motor, which then moves the carriage 19 from the forward position shown in FIG. 2 to the rearward position shown in FIG. 4. In a manner to be described hereinafter, during part of this movement of the carriage 19 the transfer means 5 move downwards towards the turntable to the position shown in FIG. 4. Another switch (not shown) stops the motor drive at the end of the rearward movement of the carriage 19. A push button 25 on the front wall 3 starts the return movement of the carriage 19 from the rearward position shown in FIG. 4 to the forward position shown in FIG. 2. A further switch (not shown) terminates the return movement of the carriage.

On the chassis 26 a turntable 27 is rotatably mounted. Beneath the chassis 26 the turntable is connected to a drive motor (not shown). The turntable has a raised rim 27b which is concentric with the axis of rotation 27a of the turntable and which supports the record disc during operation of the player. The turntable has a centering cone 27c on the upper side. The chassis 26 further supports an optical read head 28 which is movable radially with respect to the axis of rotation 27a. During rotation of a record disc 29 on the turntable 27 the read head 28 optically reads information carried on the lower surface of the disc. In the present embodiment of the player according to the invention, this disc is an optical audio disc of the "Compact Disc" type. During operation the read head 28 is moved in a radially outward direction in a slot 30 in the chassis 26.

Figure 3:
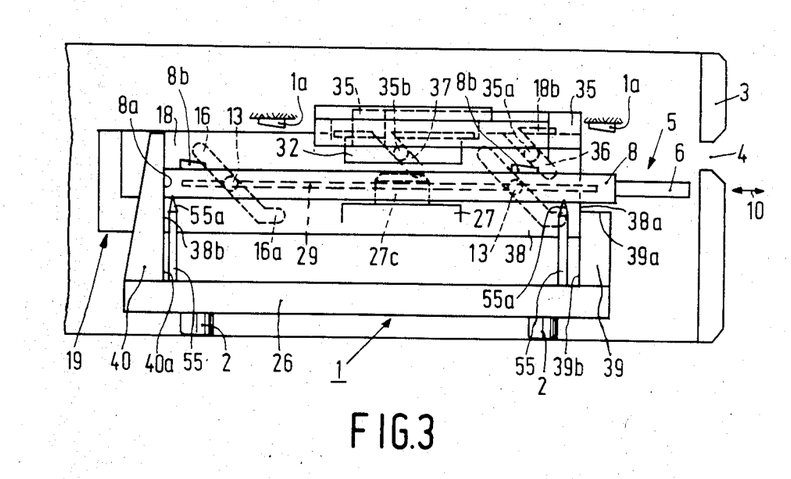
FIG. 3 is a schematic side view illustrating the first stage of the rearward movement of the carriage.

The carriage 19 and the transfer means 5 form part of a loading mechanism for loading a disc onto the turntable 27. The loading mechanism also comprises a beamlike pressure arm 31 which carries an annular pressure member 32 for pressing the disc against the turntable, the pressure member having a certain freedom of axial movement between the arm 31 and a plate 33 fixed on the upper side of the arm. The pressure member 32 is made at least partly of a magnetic material. The pressure arm 31 has end portions 31a and 31b which are guided in bifurcated guides 34 rigidly connected to the chassis 26, so that the arm 31 is movable in upward and downward directions at least substantially parallel to the axis of the turntable 27. The end portions 31a and 31b each carry two pins 35a and 35b which are spaced from one another in the direction of movement of the carriage 19 and which extend perpendicularly to this direction, the pin 35a being slightly longer than the pin 35b. In the position of the carriage 19 shown in FIG. 2 the pins 35a and 35b bear on straight guides 17a and 18a formed by the upper edges of the side walls 17 and 18 respectively of the carriage. Near the front of the carriage the straight guides 17a and 18a terminate at the open upper ends of inclined grooves 36, which are formed one in each of the side walls 17 and 18 immediately adjacent raised portions 17b and 18b on the upper edges of the side walls 17 and 18 respectively. At the end of a first stage of the rearward movement of the carriage 19 the raised portions 17a and 17b cooperate with the forward pins 35a on the pressure arm 31 to cause these pins to enter the grooves 36 and the rearward pins 35b to enter two further inclined grooves 37 formed one in each of the side walls 17 and 18 of the carriage 19. During a second stage of the rearward movement of the carriage the pins 35a and 35b slide down the grooves 36 and 37, as shown in FIG. 3. During the first stage of the rearward movement of the carriage 19 the pins 35a and 35b bear on the guides 17a and 17b to support the pressure arm 31 in an upper position above the turntable. Also, during this first stage of the rearward movement of the carriage the transfer means 5, which comprise the frame 8 and the disc holder 6 and which follow the horizontal movement of the carriage 19 during this stage, is kept at a constant upper level by two upright supports 39 which are fixed on the chassis 26 and which have horizontal surfaces 39a at their upper ends. Two bars 38 fixed beneath the side members 11 and 12 of the frame 8 slide on the horizontal surfaces 39a during the first stage of the rearward movement of the carriage 19. The rear ends 38b of the bars 38 are flush with the rear ends 8a of the side members 11 and 12 of the frame 8, while the front ends 38a of the bars 38 are located a short distance behind the front ends of the side members 11 and 12 of the frame 8. FIG. 1 shows the left-hand bar 38, viewed from the front of the player. Each of the supports 39 also has an upright abutment surface 39b which adjoins the horizontal surface 39a of the support and preferably extends substantially parallel to the axis of the turntable 27 and up which the front end 38a of the respective bar 38 slides, in a manner to be described hereinafter, during a first stage of the forward movement of the carriage 19.

On the chassis 26 two fixed stops 40 are arranged which have abutment surfaces 40a which, like the abutment surfaces 39b, also extend substantially parallel to the axis of the turntable 27. At the end of the first stage of the rearward movement of the carriage 19, the rear ends 8a of the side members 11 and 12 of the frame 8 and the rear ends 38b of the bars 38 abut the surfaces 40a and during the second stage of the rearward movement of the carriage, as the frame 8 is lowered vertically towards the turntable 27, the rear ends of the frame members 11 and 12 and the bars 38 slide down the abutment surfaces 40a. The distance between the abutment surfaces 39b and 40a is at least substantially equal to the distance between the rear ends 38b and the front ends 38a of the bars 38, so that the frame 8 can move without hindrance in the vertical direction between the abutment surfaces 39b and 40a.

Owing to the presence of the guides 34 the pressure arm 31 moves in a direction substantially parallel to the axis of the turntable as the pins 35a and 35b slide in the grooves 36 and 37.

Figure 5:
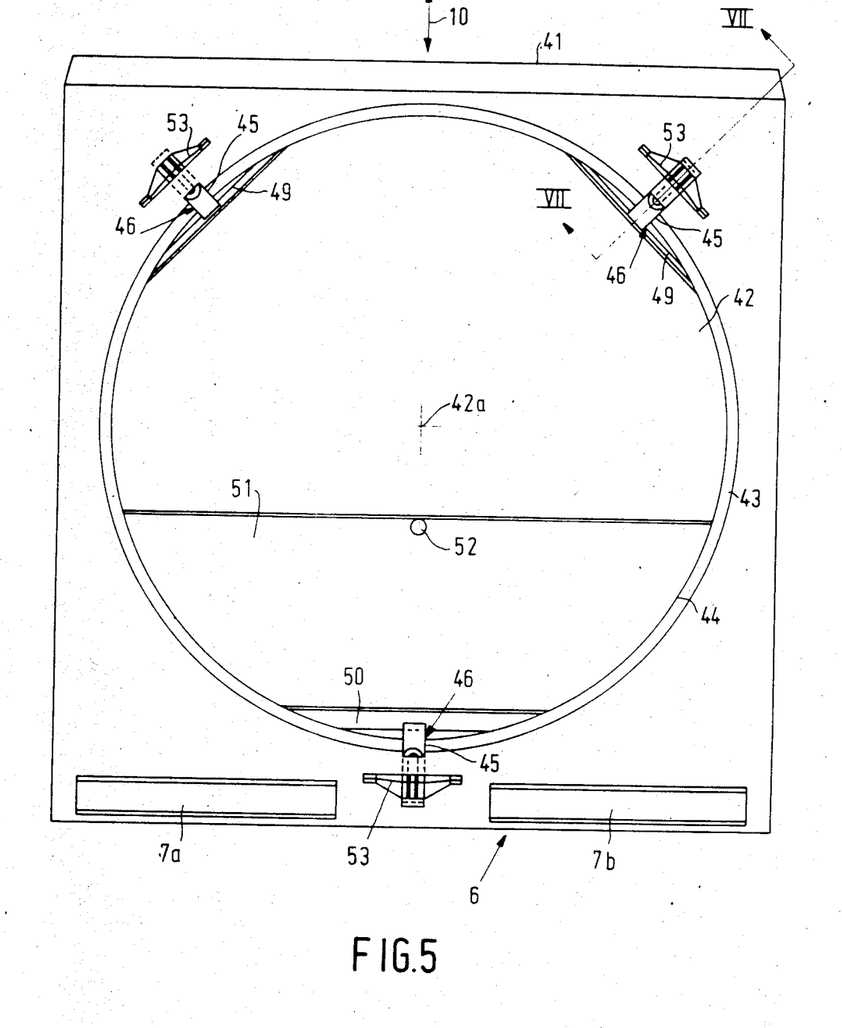
FIG. 5 is a plan view of the disc holder.
Figure 6:
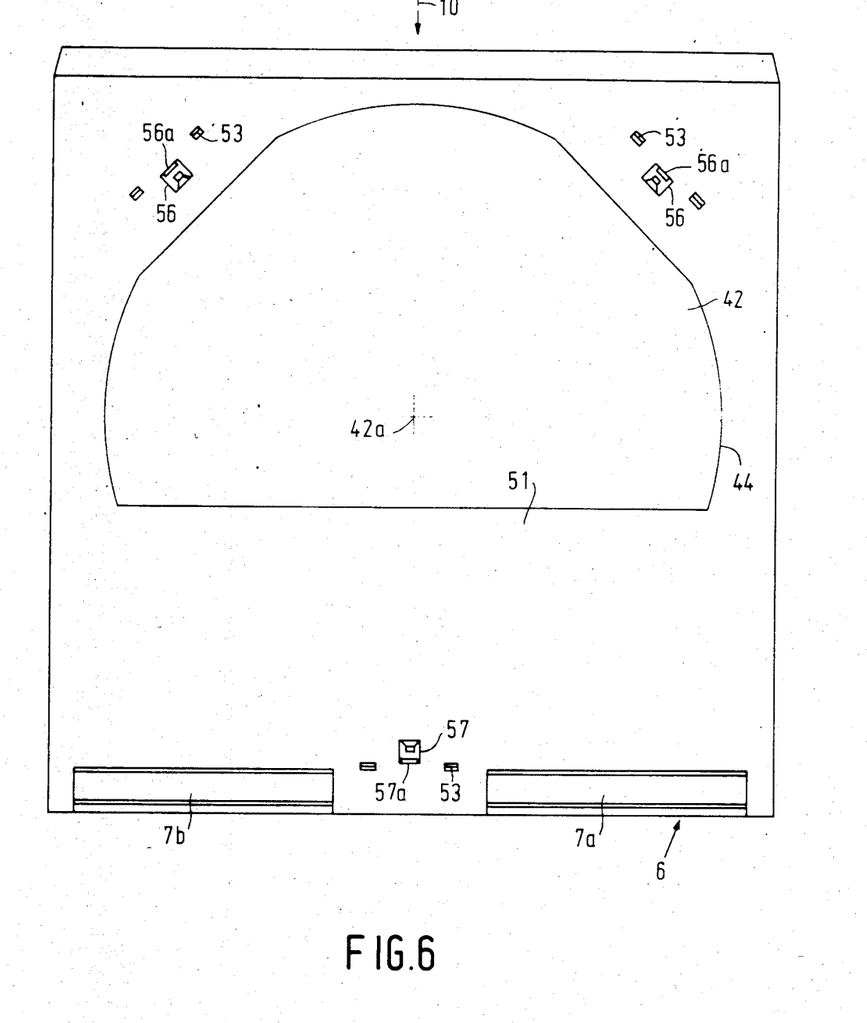
FIG. 6 is a bottom view of the disc holder.

As shown in FIGS. 5 and 6, the disc holder 6 is substantially rectangular, the rear wall 41 having slightly bevelled corners in order to facilitate insertion of the holder into the frame 8. If desired, the corners may be bevelled to a greater extent than that shown. As can be seen in FIG. 5 the holder 6 has a circular opening 42 which is completely open at the upper side of the holder and into which a record disc can be inserted. In order to facilitate insertion of the disc into the holder, the upper part of the opening 42 is bounded by a conical centering wall 43 which at its upper edge adjoins the upper surface of the holder and at its lower edge adjoins a cylindrical wall 44 bounding the lower part of the opening 42 (see also FIG. 7). The diameter of the wall 44 is slightly greater than the diameter of the disc so that the disc can be easily inserted into the space bounded by the wall 44. The wall 44 and the centering wall 43 are formed with three radial slots 45 in which catches 46 are slidably guided. Two of the catches are situated at the rear part of the opening 42 and one at the front part.

Figure 7:
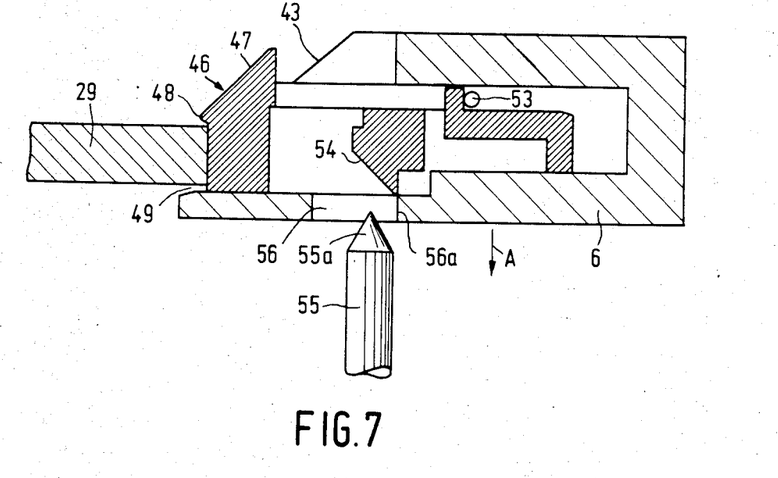
FIG. 7 is a sectional view of part of the holder taken on the line VII—VII in FIG. 5 and drawn to an enlarged scale.

As is shown in FIG. 7, each catch 46 has at its upper side an inclined surface 47 which slopes in the same direction as the centering wall 43 and which in the released position of the catch, i.e. in the radially outward position thereof, is substantially flush with adjacent portions of the centering wall 43. Beneath each of the two catches 46 which are situated at the rear part of the opening 42, the disc holder 6 has a surface 49 for supporting the disc 29, which surface is so arranged that it contacts the disc only at a peripheral portion thereof which is outside the information-carrying area of the disc. A similar supporting surface 50 is provided beneath the catch 46 which is situated at the front part of the opening 42, which surface also is arranged to cooperate only with a peripheral portion of the disc. Extending across the bottom of the front part of the opening 42 is a wall 51 which adjoins the cylindrical wall 44 of the opening and the edge of which, in the embodiment shown in FIGS. 5 and 6, extends along a chord which is subtended by an arc of approximately 100° struck about the center 42a of the opening 42. The bottom wall 51 carries a pointed support 52 in a position such that it will be situated near the center hole of a record disc supported in the opening 42 and therefore next to that part of the disc surface where no essential information is stored. The bottom wall 51 is deflected, for example, when the holder is gripped. The support 52 is the only part that comes into contact with the disc, so that there is no contact with those parts of the disc where important information is stored. Thus, the disc is protected effectively and there is no risk that the area of the lower disc surface where optically readable information is stored can be damaged, for example, by scratches. As is shown in FIG. 7, the disc 29 is retained on the supporting surfaces 49 and 50 by projecting portions 48 of the catches 46. A wire spring 53 associated with each catch 46 urges the catch into a radially inward latching position. Latching the disc in the disc holder is effected smoothly, because the disc merely has to be pressed axially downwards on the inclined surfaces 47 of the catches. As the edge of the disc slides down these surfaces, the catches 46 are displaced radially outwards until the disc has passed the projecting catch portions 48, after which the springs 53 urge the catches 46 back into the latching positions. The catches 46 also each comprise an inclined contact surface 54 (shown in FIG. 7) which performs a function in the release of the catches 46 by means of release elements, which are arranged on the chassis 26 and which comprise upright pins 55 with conical end portions 55a. A pin 55 is provided for each catch 46. As is shown in FIG. 6, three apertures are formed in the bottom of the disc holder 6, two, designated 56, beneath the two catches 46 which are situated at the rear part of the opening 42, and one, designated 57, beneath the catch 46 which is situated at the front part of the opening. The two apertures 56 each have a larger dimension than the aperture 57 in a direction perpendicular to the direction of movement of the adjacent catch 46. Preferably, this dimension of the aperture 57 is substantially equal to the diameter of the pins 55. The apertures 56 and 57 have walls 56a and 57a respectively which extend perpendicularly to the directions of movement of the respective catches 46 and 10 which are situated at substantially equal radial distances from the center 42a of the opening 42. When, during the second stage of the rearward movement of the carriage 19, the disc holder 6 is lowered vertically into the frame 8 towards the turntable 27, the conical end portions 55a of the pins 55 enter the apertures 56 and 57. The edges of the conical end portions 55a then cooperate with the walls 56a and 57a of the apertures so that the disc holder 6 is centered accurately relative to the axis of rotation 27a of the turntable by the pins 55. In this way the disc 29 is pre-centered satisfactorily before it is lowered onto the centering cone 27c. The smaller dimension of the aperture 57 in the direction perpendicular to the direction of movement of the adjacent catch 46 also provides an effective locking of the disc holder against rotation. As the downward movement of the disc holder continues, the conical end portions 55a of the pins 55 come into contact with the inclined contact surfaces 54 of the catches 46. This is the position shown in FIG. 3, which is obtained during the movement of the pins 13 of the frame 8 in the grooves 16 in the side walls of the carriage 19. As the holder is lowered further, the catches are moved radially outwards by the pins 55 against the force of the wire springs 53, so that the disc 29 is released. During the upward movement of the disc holder 6 when the disc has been played, the wire springs 53 urge the catches radially inwards to latch the disc in the disc holder again.

The above loading mechanism operates as follows:

In the forward position of the carriage 19 shown in FIG. 2, the pins 13 of the frame 8 are at the upper ends of the grooves 16 in the side walls of the carriage. The pressure arm 31 carrying the pressure member 32 is supported in the upper position above the turntable 27 by the pins 35a and 35b bearing on the guides 17a and 18a respectively. On its upper side the frame 8 preferably has members 8b with upwardly facing inclined surfaces which in the forward position of the carriage 19 cooperate with downwardly facing inclined surfaces on stops 1a fixed in the upper part of the housing 1. In this position of the carriage 19, the frame 8 is held firmly between the stops 1a and the rubber pads 2 via the supports 39 and the chassis 26, so that its position relative to the housing cannot be disturbed by shocks to which the housing 1 may be subjected. The disc 29 to be played is first inserted into the opening 42 in the disc holder 6. During the insertion the catches 46 are urged radially outwards by the pressure exerted by the disc 29 on the inclined surfaces 47 adjoining the center wall, thereby moving the catches into outwardly deflected positions. This enables a disc to be readily inserted into the space bounded by the cylindrical wall 44 of the opening 42. When the disc 29 has passed the projecting portions 48 of the catches 46, the disc bears on the supporting surfaces 49 and 50 of the disc holder. Immediately after the disc has passed the catch portions 48, the springs 53 urge the catches 46 radially inwards to latch the disc in the disc holder 6. This insertion of the disc into a disc holder has to be effected only once if the disc is to remain in the disc holder and be placed in a storage system after it has been played. The advantage of this is that the disc itself need not be touched; only the holder has to be held at the grip portions 7a and 7b. The lower surface of the disc 29, which is of the "Compact Disc" type, carries optically readable information. The disc is therefore situated in the holder with the information-carrying surface facing downwards. The part of this surface which is near the part of the disc holder is covered by the bottom wall 51 of the holder and is protected thereby against fingerprints. On the other hand, the remaining open grip portions of the bottom of the opening 42 in the disc holder is large enough to allow the turntable 27 to pass through the opening 42 during the lowering of the holder 6, as will be described hereinafter. Once it is latched in the disc holder 6 the disc may be left in any desired position, which also permits a vertical position of the disc during storage or when it is loaded into a player in which the turntable is arranged to rotate about a horizontal as opposed to a vertical axis.

Figure 4:
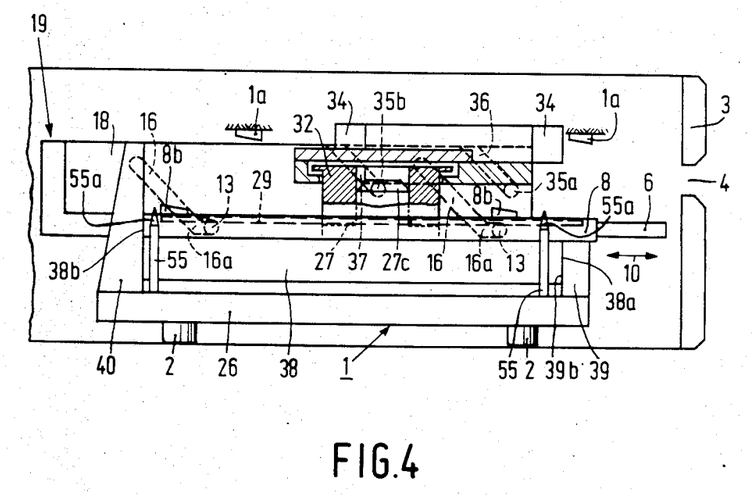
FIG. 4 is a schematic side view showing the carriage at the end of the second stage of its rearward movement.

The holder 6 is now inserted into the frame 8 through the opening 4 in the front wall 3 of the housing 1 and through the loading slot 9 in the front part of the frame 8. This starts the drive of the carriage 19, and the frame 8, with the disc holder 6, as already stated, moves horizontally with the carriage during the first stage of the rearward movement of the carriage. At the beginning of this movement the members 8b on the frame 8 are disengaged from the stops 1a on the housing 1. During this first stage of the rearward movement of the carriage 19 the transfer means 5 are maintained at a constant upper level by the bars 38 sliding on the horizontal surfaces 39a of the supports 39. The first stage of the rearward movement is terminated by the abutment of the rear ends 38b of the bars 38 with the abutment surfaces 40a of the stops 40. During the second stage of the rearward movement of the carriage 19, due to the movement of the carriage and the inclination of the grooves 16 in the side walls of the carriage, the pins 13 on the frame 8 slide down the grooves 16. As the second stage of the rearward movement of the carriage 19 begins, the pins 35a and 35b on the pressure arm 31 enter the grooves 36 and 37 respectively in the side walls of the carriage. During the first stage of the rearward movement of the carriage, the slightly greater length of the forward pins 35a enable these pins to pass over the open upper ends of the rearward grooves 37 without entering these grooves, which for this reason have a depth slightly smaller than the length of the pins 35a. Due to the cooperation between the pins 13 and the inclined grooves 16 and between the pins 35a and 35b and the inclined grooves 36 and 37, both the transfer means 5 and the pressure arm 31 with the pressure member 32 move substantially vertically towards the turntable 27 during the second stage of the rearward movement of the carriage 19, the pressure member 32 still remaining some distance above the transfer means 5. The transfer means 5, comprising the frame 8 and the disc holder 6, can move past the turntable 27 without being impeded thereby, owing to the presence of the opening 42 in the disc holder 6. In the position shown in FIG. 3, the holder 6 has already been pre-centered in the manner described earlier herein by the cooperation of the conical end portions 55a of the pins 55 with the walls 56a and 57a of the apertures 56 and 57 in the disc holder. Also, the conical end portions 55a, by cooperation with the inclined surfaces 54 of the catches 46, have urged the catches radially outwards as the disc holder moves downwards with the frame 8 as indicated by the arrow A in FIG. 7, so that the disc 29 is unlatched. The catches remain in this released position against the force of the springs 53 until the transfer means 5 are raised again. As already described, the holder 6 is locked against rotation by the pins 55. The disc 29 is now clear of the disc holder 6 and can slide onto the centering cone 27c. This takes place very smoothly owing to the pre-centering of the disc by the pins 55. The transfer means 5 continue to descend until the pins 13 on the frame 8 reach substantially horizontal lower end portions 16a of the grooves 16 in the side walls of the carriage 19. The transfer means are then in a fully lowered position but when they enter this position the pins 35a and 35b on the pressure arm 31 have not yet reached the lower ends of the grooves 36 and 37 respectively in the side walls of the carriage 19. The carriage travels slightly further in the rearward direction until the pins 13 have reached the ends of the horizontal portions 16a of the grooves 16. This allows the pressure arm 31 to be moved down a little further so that the pressure member 32 can urge the disc effectively onto the turntable, as shown in FIG. 4. It is important that the conical end portions 55a of the release pins 55 are so arranged with respect to the grooves 16, 36 and 37 that the catches 46 are released as the transfer means 5 are lowered past the turntable 27, while it may be advantageous if the pressure member 32 acts on the disc immediately after the disc has been lowered onto the turntable 27.

When the disc has been played, the button 25 may be pressed to start the forward movement of the carriage 19 in the direction of the arrow 19. During the first stage of this movement the front ends 38a of the bars 38 on the frame 8 abut the abutment surfaces 39b of the supports 39 on the chassis 26. As a result, due to the cooperation between the pins 13 on the frame 8 and the grooves 16 in the side walls of the carriage 19 and between the pins 35a and 35b on the pressure arm 31 and the grooves 36 and 37 respectively in the side walls of the carriage, as the carriage moves forward the frame 8 and disc holder 6 and the pressure arm 31 are moved upwards. In the initial part of this first stage of the forward movement of the carriage 19, however, the pins 13 are located in the horizontal lower end portions 16a of the grooves 16, with the result that the frame 8 and disc holder 6 remain stationary in the lower position as the pressure arm 31 begins to rise. Thus, the pressure member 32 is lifted off the disc 29 by the pressure arm 31 before the disc holder 6 lifts the disc off the turntable 27, the disc being received in the opening 42 in the disc holder again as the holder rises with the frame 8 past the turntable. Immediately after this the inclined surfaces 54 of the catches 46 become disengaged from the end portions 55a of the pins 55 so that the catches 46 are moved radially inwards by the springs 53 to latch the disc in the disc holder again. When the pins 13, 35a and 35b reach the upper ends of the grooves 16, 36 and 37 respectively the second stage of the forward movement of the carriage 19 begins, during which stage the bars 38 on the frame 8 slide on the horizontal surfaces 39a of the supports 39 as the frame 8 and disc holder 6 move forward into the carriage, and the pressure arm 31 with the pressure member 32 is again supported in the upper position by the pins 35a and 35b bearing on the guides 17a and 18a respectively. When the carriage has reached the forward position shown in FIG. 2 again, in which position the members 8b of the frame 8 engage with the stops 1a on the housing so that the frame is in a stable position relative to the housing, the disc holder 6 can be withdrawn from the frame 8 and, if desired, another disc holder containing a disc can be inserted.

It is to be noted that instead of the construction described in the foregoing, where the holder 6 and the pressure member 32 move towards the turntable, it is possible, in a manner not shown, to lift the turntable 27 by means of the pins 55. Essential is the release of the catches 46 by means of the pins 55 without the use of a separate moving mechanism in the player, employing transfer means 5 which can move relative to the turntable to a position at least partly below the level of the turntable 27 and which release the disc during this movement, after which the pressure member 32 presses the disc against the turntable.

The disc holder 6 is very suitable for use in situations in which it is difficult to hold the disc 29 only at its edge in order to avoid leaving fingerprints on the information-carrying surface of the disc. Such a situation may occur in mobile disc-record players, such as those used in cars. The latching of the disc in the disc holder is then of great advantage, because this ensures that shocks exerted on the player during operation of the loading mechanism cannot disturb the position of the disc, while the pre-centering of the disc holder provides an additional correction possibility before the disc is transferred to the turntable.

Moreover, the disc holder 6 is of advantage for use in disc-record changers, because the holder enables correctly positioned discs to be transferred to and from the turntable during changing of discs without a risk of the discs dropping out of the holders.

Instead of the two grip portions 7a and 7b, the disc holder, in a manner not shown, may comprise one central grip projecting from the front of the holder 6 near the aperture 57.

Also, it is to be noted that instead of the magnetic pressure member 32, the disc can be pressed in position on the turntable, in a manner not shown, by means of the pressure arm 31 through spring force acting on the pressure member 32, preferably by means of a compression spring arranged between the arm 31 and the pressure member 32.

I claim:
1. A disc-record player comprising:
 (a) a housing;
 (b) a chassis supported in said housing;
 (c) a turntable rotatably mounted on said chassis, the axis of rotation of said turntable defining an axial direction;
 (d) a disc reading means displaceably mounted on said chassis;
 (e) a loading mechanism for loading a disc onto said turntable comprising;
  (i) a disc holder for holding said disc prior to loading, said disc holder having a cylindrical wall defining a cylindrical space of circular cross section for receiving said disc, said space being completely open toward an upper side of the holder, said disc holder having an opening formed in a lower side, said disc holder having at least one spring-loaded, radially movable latching element arranged adjacent said cylindrical wall and formed to axially latch said disc when in a first radial position and to axially release said disc when in a second radial position, and said disc holder having a surface adjacent each latching element for axially supporting said disc on one side;

(ii) a frame provided with guide means for slidably receiving said disc holder, said frame being axially movable relative to said chassis between an upper position corresponding to said disc not being loaded on said turntable and a lower position corresponding to said disc being loaded on said turntable, said opening formed in the lower side of said disc holder being arranged such that said turntable extends therethrough when said frame is in said lower position;

(iii) a pressure member which is axially movable relative to said chassis for pressing said disc against said turntable; and (iv) control means for controlling the axial movements of said frame and said pressure member; and (f) at least one release element axially upwardly directed relative to said chassis;

wherein at least one pair of latching and release elements is arranged such that each latching element is radially displaced by said corresponding release element as said frame is moved to its lower position, following which said disc is released and cleared from said disc holder and urged against said turntable by said pressure member.

2. A disc-record player as claimed in claim 1 further including
at least a second spring loaded catch disposed at a circumferentially spaced interval on the circumference of the disc in the holder and movable radially of the disc, and
at least a second upwardly directed release element.

3. A disc-record player as claimed in claim 1, further said guide means comprising U-section guides for the disc holder on both sides viewed in the direction of insertion of the disc holder and has a slide-in portion which is movable to a position near a front aperture in the housing, in which position it abuts stops on the upper side, so that the chassis is in a fixed position in the housing.

4. A disc-record player as claimed in claim 2, wherein said guide means comprising U-section guides for the disc holder on both sides viewed in the direction of insertion of the disc holder and has a slide-in portion which is movable to a position near a front aperture in the housing, in which position it abuts stops on the upper side, so that the chassis is in a fixed position in the housing.

5. A disc-record player as claimed in claim 4, characterized in that upper and downward movements of the frame are controlled by grooves in a carriage which is rectilinearly movable between forward and rearward positions in the housing; during a first stage of the rearward movement of the carriage the frame with the disc holder is retained in an upper position in the grooves by positioning means; during a second stage of the rearward movement the frame acts against an upright stop and performs the axially directed movement towards the turntable, moving towards a lower position in the grooves; and during the second stage of the rearward movement the pressure arm is also guided towards the turntable by means of grooves in the carriage, the grooves and the stop constituting the control means.

6. A disc-record player as claimed in claim 1, characterized in that the release elements comprise pins which in cooperation with the walls of apertures in the disc holder also center the disc holder relative to the turntable.

7. A disc-record player as claimed in claim 6, characterized in that there are provided three release pins and three catches, one pin being situated near the front of the housing, which release pins also lock the disc holder against rotation after release of the disc.

8. A disc-record player as claimed in claim 6 or 7, characterized in that the arrangement of the conical end portions with respect to the grooves of the pressure member is such that the pressure member urges the disc against the turntable immediately after release of the disc.

9. A disc holder as claimed in claim 1, characterized in that the disc holder comprises a cylindrical wall which adjoins the centering wall and which has a diameter which is larger than the disc diameter, the catches being movable through apertures in the cylindrical wall.

10. A disc holder as claimed in claim 9, characterized in that each catch has an inclined surface which slopes in substantially the same direction as the centering wall and which in the released position of the catch is substantially flush with the centering wall.

11. A disc holder as claimed in claim 9, characterized in that the disc holder comprises a bottom wall at the side which faces the turntable, which bottom wall adjoins the cylindrical wall and extends across the bottom of a front part of the opening bounded by the cylindrical wall.

12. A disc holder as claimed in claim 11, characterized in that the bottom wall carries a pointed support which is arranged so that it can contact a disc in the holder only near the center hole of the disc, i.e. at that part of the disc surface where no essential information is stored.

13. A disc record player as in claim 1 further comprising a conical centering wall facing the upper side of the holder, said conical centering wall being connected to said cylindrical wall and lying between said cylindrical wall and said upper side.

14. A disc record player as in claim 1 wherein said at least one release element is fixed arranged on said chassis and has a conical end portion.

15. A disc record player as in claim 1 wherein said chassis is resiliently supported in said housing.

* * * * *